United States Patent
Dombkowski et al.

(10) Patent No.: US 7,321,551 B2
(45) Date of Patent: Jan. 22, 2008

(54) PROPAGATION OF A PLURALITY OF COPIES OF AN INTERNET PROTOCOL PACKET

(75) Inventors: Kevin Eugene Dombkowski, Oswego, IL (US); Richard Thomas Emery, Aurora, IL (US); Steven Mark Miller, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 821 days.

(21) Appl. No.: 10/767,112

(22) Filed: Jan. 28, 2004

(65) Prior Publication Data

US 2005/0163145 A1 Jul. 28, 2005

(51) Int. Cl.
*H04L 12/56* (2006.01)
(52) U.S. Cl. .................................... 370/216; 370/390
(58) Field of Classification Search ............... 370/216, 370/389, 390, 474
See application file for complete search history.

(56) References Cited

U.S. PATENT DOCUMENTS 6,496,477 B1 * 12/2002 Perkins et al. ............... 370/228
6,831,898 B1 * 12/2004 Edsall et al. ................. 370/256
7,107,334 B1 *  9/2006 Shaffer et al. ............... 709/224
2006/0256768 A1 * 11/2006 Chan .......................... 370/351

FOREIGN PATENT DOCUMENTS

| EP | 0 505 601 | 9/1992 |
|----|-----------|--------|
| EP | 1 202 597 | 5/2002 |
| WO | WO 00/13376 | 3/2000 |

OTHER PUBLICATIONS

Orda, A et al., "Routing with Packet Duplication and Elimination In Computer Networks", IEEE Transactions on Communications, Jul. 1, 1988, vol. 36, No. 7, p. 860-866, IEEE Inc.

Chung-Sheng, Li et al., "Implementation and performance analysis of congestion-tolerant isochronous communication in ATM networks using diversified routing".

Aweya, James, "On the design of IP routers, Part 1: Router architectures", Journal of Systems Architecture, Apr. 2000, pp. 483-511, vol. 46, No. 6, Elsevier Science.

* cited by examiner

*Primary Examiner*—Melvin Marcelo

(57) ABSTRACT

An apparatus in one example comprises a router for one or more packets that comprise an Internet Protocol ("IP") packet. The router comprises one or more packet replication components that employ the IP packet to propagate a plurality of copies of the IP packet.

20 Claims, 2 Drawing Sheets

PROPAGATION OF A PLURALITY OF COPIES OF AN INTERNET PROTOCOL PACKET

TECHNICAL FIELD

The invention relates generally to communications and more particularly to routers for Internet Protocol packets.

BACKGROUND

Internet Protocol ("IP") routers propagate IP packets through an IP network to a destination. For example, an IP router receives a first IP packet, determines where to send the first IP packet, and routes the first IP packet through an IP fabric towards the destination. If the first IP packet is lost before reaching the destination, then a sending component of the first IP packet sends a second IP packet that contains the data of the first IP packet. In one example, a link between the sending component and the destination is down causing the first IP packet to not reach the destination. So, in an attempt to successfully get the data to the destination, the sending component retransmits the data in the second IP packet.

The IP packet in one example is part of a sequence of IP packets. For example, a receiving component at the destination combines the data from the IP packet and other received IP packets in the sequence of IP packets into a data string or file. In one example, the sequence of IP packets is associated with a time-insensitive application. So, a time delay between an expected receipt of the first IP packet and actual receipt of the second IP packet does not make much of a difference in the performance of the time-insensitive application.

In another example, the sequence of IP packets is associated with a time-sensitive application. The time-sensitive application may be a real-time application such as real-time audio or video. So, the time delay between the expected receipt of the first IP packet and the actual receipt of the second IP packet may cause a problem for the time-sensitive application. The time-sensitive application may be unable to wait for a retransmission in the second IP packet of the missing data from the first IP packet. For example, the time-sensitive application may experience a service glitch or missing data in the real-time data stream. As one shortcoming, missing the first IP packet causes a service glitch that lowers a quality of service of the time-sensitive application.

Thus, a need exists for an IP router that promotes a reduction in IP packet transmission failures that cause service glitches in time-sensitive applications.

SUMMARY

The invention in one embodiment encompasses an apparatus. The apparatus comprises a router for one or more packets that comprise an Internet Protocol ("IP") packet. The router comprises one or more packet replication components that employ the IP packet to propagate a plurality of copies of the IP packet.

Another embodiment of the invention encompasses a method. An IP packet is received. A plurality of copies of the IP packet are generated. The plurality of copies of the IP packet comprise a first copy of the IP packet and a second copy of the IP packet. The first copy of the IP packet is propagated through a first path to an intended destination of the IP packet. The second copy of the IP packet is propagated through a second path to the intended destination of the IP packet.

Yet another embodiment of the invention encompasses an article. The article comprises one or more computer-readable signal-bearing media. The article comprises means in the one or more media for receiving an IP packet. The article comprises means in the one or more media for generating a plurality of copies of the IP packet. The plurality of copies of the IP packet comprise a first copy of the IP packet and a second copy of the IP packet. The article comprises means in the one or more media for propagating the first copy of the IP packet through a first path to an intended destination of the IP packet. The article comprises means in the one or more media for propagating the second copy of the IP packet through a second path to the intended destination of the IP packet.

DESCRIPTION OF THE DRAWINGS

Features of exemplary implementations of the invention will become apparent from the description, the claims, and the accompanying drawings in which:

DETAILED DESCRIPTION

Figure 1:
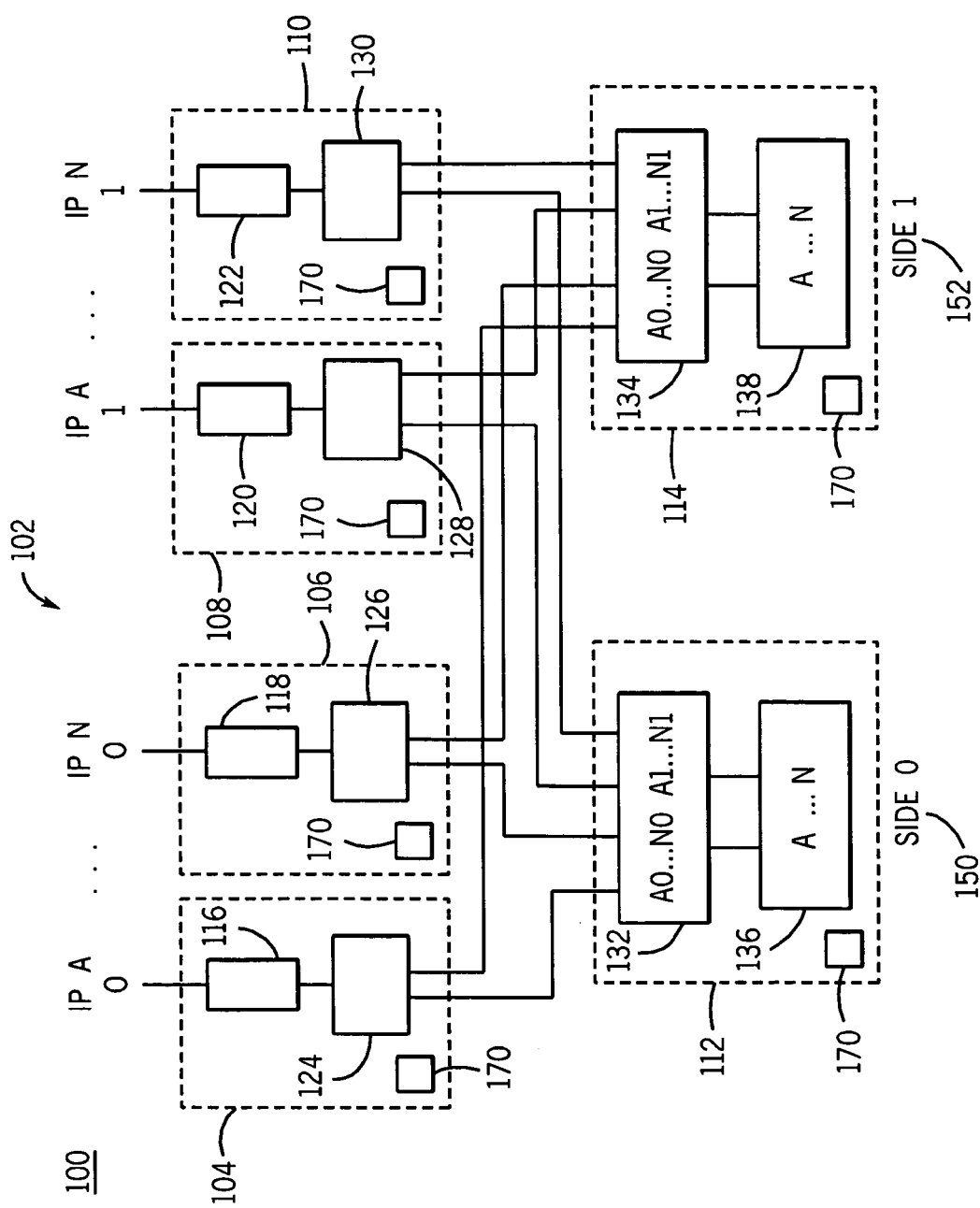
FIG. 1 is a representation of an exemplary implementation of an apparatus that comprises one or more Internet Protocol routers for one or more Internet Protocol packets.

Turning to FIG. 1, an apparatus 100 in one example comprises one or more routers for one or more packets. For example, the one or more routers comprise an Internet Protocol ("IP") router 102 for one or more IP packets. The IP router 102 in one example comprises one or more paddle cards 104, 106, 108, and 110 and one or more switch fabrics 112 and 114. The paddle cards 104, 106, 108, and 110 comprise one or more line interfaces 116, 118, 120, and 122 and one or more packet replication/selection components 124, 126, 128, and 130. The switch fabrics 112 and 114 comprise one or more packet replication/selection components 132 and 134 and one or more IP switch fabrics 136 and 138.

The IP router 102 in one example interconnects switches or switch interface components in an IP network. The IP router 102 in one example comprises a duplex IP router that propagates a plurality of copies of an IP packet. The IP router 102 comprises a duplex switch fabric and a plurality of paths for propagation of packets. In one example, the IP router 102 receives one IP packet, generates a plurality of copies of the IP packet, and outputs two copies of the IP packet on two different paths to an intended destination of the IP packet. In another example, the IP router 102 receives two copies of the IP packet and outputs two copies of the IP packet on two different paths to the intended destination of the IP packet.

The two copies of the IP packet appear to originate from a single source. For example, the two copies of the IP packet comprise copies of a single IP header and are associated with a single IP address. The router 102 is configured to allow multiple IP packets with the same IP address and the same time stamp. The plurality of copies of the IP packet in one example exist as copper wires in a back plane and the transitory flow of electrons that represent the copies of the IP packet can be recycled over and over again. The packet replication/selection component 124 in one example receives an IP packet and propagates two copies of the IP packet. In one example, the two copies are reproductions of the IP packet. In another example, one of the two copies may be the received IP packet itself and the other of the two copies may be a reproduction of the IP packet.

The line interfaces 116, 118, 120, and 122 interface the IP router 102 with an IP network. For example, the IP router 102 may receive IP packets from the IP network on the line interfaces 116, 118, 120, and 122. Also, the IP router 102 may send IP packets out to the IP network on the line interfaces 116, 118, 120, and 122. In one example, the IP router 102 sends IP packets to one or more additional simplex or duplex routers in the IP network. In another example, the IP router 102 receives IP packets from one or more additional simplex or duplex routers in the IP network.

The packet replication/selection components 124, 126, 128, 130, 132 and 134 may replicate an IP packet, select an IP packet from a plurality of available IP packets, or both replicate and select an IP packet. The packet replication/selection components 124, 126, 128, 130, 132 and 134 may employ the IP packet to generate a plurality of copies of the IP packet. For example, the packet replication/selection components 124, 126, 128, 130, 132 and 134 may receive the IP packet and employ the received IP packet to make a bit for bit copy of the IP packet. The packet replication/selection components 124, 126, 128, 130, 132 and 134 serve as interfaces between the line interfaces 116, 118, 120, and 122 and the IP switch fabrics 136 and 138.

In one example, if one of the packet replication/selection components 124, 126, 128, 130, 132 and 134 receives a single IP packet, then the one of the packet replication/selection components 124, 126, 128, 130, 132 and 134 that received the IP packet duplicates the packet and propagates two copies of the IP packet. For example, the packet replication/selection component 124 may receive an IP packet from the line interface 116 and generate two copies of the IP packet for propagation to the packet replication/selection components 132 and 134.

In another example, if one of the packet replication/selection components 124, 126, 128, 130, 132 and 134 receives two IP packets, then the one of the packet replication/selection components 124, 126, 128, 130, 132 and 134 that received the two IP packets selects one of the two IP packets for propagation. For example, the packet replication/selection component 126 may receive two copies of an IP packet from the packet replication/selection components 132 and 134 and select one of the two copies for propagation to the line interface 118.

The IP router 102 in one example comprises a first side 150 and a second side 152. During operation of the IP router 102, one of the sides 150 and 152 is active. For example, when presented with two copies of an IP packet, the packet replication/selection components 124, 126, 128, 130, 132 and 134 select the copy of the IP packet from the one of the sides 150 and 152 that is active. If one of the sides 150 and 152 fails, then the packet replication/selection components 124, 126, 128, 130, 132 and 134 select the copy of the IP packet from the available one of the sides 150 and 152. The IP router 102 may use header checks or framing checks to determine if the received IP packet is ok. For example, the packet replication/selection components 124, 126, 128, 130, 132 and 134 may determine if a received packet is good. If the packet replication/selection components 124, 126, 128, 130, 132 and 134 have two available copies of an IP packet that are good, then the packet replication/selection components 124, 126, 128, 130, 132 and 134 may discard one of the two available copies.

The IP switch fabrics 136 and 138 receive IP packets and determine a next location to send the IP packets. For example, the IP switch fabric 136 may receive an IP packet from the packet replication/selection component 124, analyze the IP packet to determine the intended destination of the IP packet, and then send the IP packet to the packet replication/selection component 126 for propagation through the line interface 118 to the IP network.

The IP packet in one example is associated with a time-sensitive application. The time-sensitive application may be a real-time application such as real-time audio or video. A time delay of the IP packet in a sequence of IP packets for the real-time application may cause a problem for the real-time application. For example, if the IP packet is delayed or lost, the real-time application may be unable to wait for a transmission of a replacement IP packet and the real-time application will experience a glitch in service. To avoid experiencing a glitch in service, the IP router 102 contemporaneously and/or simultaneously propagates a plurality of copies of the IP packet towards an intended destination. The plurality of copies of the IP packet in one example are identical. Therefore, if one of the copies of the IP packet does not arrive at the intended destination, then one of the other of the plurality of copies will likely arrive at the intended destination. The plurality of copies of the IP packet travel through different paths through a network to avoid sending all copies of the IP packet though a single potential link failure. Propagating a plurality of copies of the IP packet promotes an increase in likelihood that at least one copy of the plurality of copies of the IP packet will arrive at the real-time application.

An illustrative description of one exemplary operation of the apparatus 100 is now presented, for explanatory purposes. The IP router 102 in one example receives a single IP packet from a IP network component, such as, a simplex or duplex IP router. For example, the IP router 102 receives the IP packet on the line interface 116. The line interface 116 passes the IP packet to the packet replication/selection component 124. The packet replication/selection component 124 generates a plurality of copies of the IP packet. For example, the packet replication/selection component 124 generates a first copy of the IP packet and a second copy of the IP packet.

The packet replication/selection component 124 sends the first copy of the IP packet to the packet replication/selection component 132 on the switch fabric 112. The packet replication/selection component 124 sends the second copy of the IP packet to the packet replication/selection component 134 on the switch fabric 114. So, at this point two copies of the IP packet exist in the IP router 102. For example, at this point each of the switch fabrics 112 and 114 carry one copy of the IP packet. The packet replication/selection components 132 and 134 have only one copy of the IP packet to choose for propagation. Therefore, the packet replication/selection component 132 passes the first copy of the IP packet to the IP switch fabric 136 and the packet replication/selection component 134 passes the second copy of the IP packet to the IP switch fabric 138.

The IP switch fabrics 136 and 138 determine an intended destination of the IP packet. Then, the IP switch fabrics 136 and 138 send the copies of the IP packet through separate paths towards the intended destination. For example, the IP switch fabric 136 sends the first copy of the IP packet to the packet replication/selection component 132 and the IP switch fabric 138 sends the second copy of the IP packet to the packet replication/selection component 134.

The packet replication/selection component 132 generates a plurality of copies of the first copy of the IP packet. For example, the packet replication/selection component 132 generates a first copy of the first copy of the IP packet and a second copy of the first copy of the IP packet. The packet replication/selection component 132 sends the first copy of the first copy of the IP packet to the packet replication/ selection component 126 on the paddle card 106. The packet replication/selection component 132 sends the second copy of the first copy of the IP packet to the packet replication/ selection component 130 on the paddle card 110.

The packet replication/selection component 134 generates a plurality of copies of the second copy of the IP packet. For example, the packet replication/selection component 134 generates a first copy of the second copy of the IP packet and a second copy of the second copy of the IP packet. The packet replication/selection component 134 sends the first copy of the second copy of the IP packet to the packet replication/selection component 126 on the paddle card 106. The packet replication/selection component 134 sends the second copy of the second copy of the IP packet to the packet replication/selection component 130 on the paddle card 110.

So, at this point four copies of the IP packet exist in the IP router 102. For example, each of the paddle cards 106 and 110 receive two copies of the IP packet. The packet replication/selection components 126 and 132 each have two copies of the IP packet to choose from for propagation. Therefore, the packet replication/selection component 126 passes one of the first copy of the first copy of the IP packet and the first copy of the second copy of the IP packet to the line interface 118. The packet replication/selection component 130 passes one of the second copy of the first copy of the IP packet and the second copy of the second copy of the IP packet to the line interface 122. The line interfaces 118 and 122 each propagate the copy of the IP packet chosen by the packet replication/selection components 126 and 130. So, the IP router 102 in one example contemporaneously and/or simultaneously outputs two IP packets into the IP network. In one example, the IP router 102 sends the two packets to a duplex IP component in the IP network. In another example, the IP router 102 sends a first one of the two packet to a first IP component in the IP network and a second one of the two packets to a second IP component in the IP network. The two IP packets are substantially identical. For example, the two IP packets may be exact duplicates of each other to promote an increase in likelihood that the data of at least one of the IP packets arrives at the intended destination.

An illustrative description of another exemplary operation of the apparatus 100 is now presented, for explanatory purposes. The IP router 102 in one example contemporaneously and/or simultaneously receives a plurality of IP packets that are substantially identical. For example, the IP router 102 may receive two IP packets from one or more duplex IP network components or two simplex IP network components. For example, the IP router 102 receives a first IP packet on the line interface 116 and a second IP packet on the line interface 120. The first IP packet and the second IP packet are substantially identical. For example, the first IP packet and the second IP packet are copies of a single IP packet for propagation through the IP network. The line interface 116 passes the first IP packet to the packet replication/selection component 124. The line interface 120 passes the second IP packet to the packet replication/selection component 128.

The packet replication/selection component 124 generates a plurality of copies of the first IP packet. For example, the packet replication/selection component 124 generates a first copy of the first IP packet and a second copy of the first IP packet. The packet replication/selection component 128 generates a plurality of copies of the second IP packet. For example, the packet replication/selection component 128 generates a first copy of the second IP packet and a second copy of the second IP packet.

The packet replication/selection component 124 sends the first copy of the first IP packet to the packet replication/selection component 132 on the switch fabric 112. The packet replication/selection component 124 sends the second copy of the first IP packet to the packet replication/selection component 134 on the switch fabric 114. The packet replication/selection component 128 sends the first copy of the second IP packet to the packet replication/selection component 132 on the switch fabric 112. The packet replication/selection component 128 sends the second copy of the second IP packet to the packet replication/selection component 134 on the switch fabric 114.

So, at this point four IP packets exist in the IP router 102. For example, each of the switch fabrics 112 and 114 comprise one copy of the each of the first and second IP packets. The packet replication/selection components 132 and 134 each have one copy of each of the first and second IP packets to choose from for propagation. Therefore, the packet replication/selection component 132 passes one of the first copy of the first IP packet and the first copy of the second IP packet to the IP switch fabric 136. The packet replication/selection component 134 passes one of the second copy of the first IP packet and the second copy of the second IP packet to the IP switch fabric 138.

The IP switch fabrics 136 and 138 determine an intended destination of the first and/or second IP packets. Then, the IP switch fabrics 136 and 138 send two copies of the first and/or second IP packet through separate paths towards the intended destination. For example, the IP switch fabric 136 sends a copy of the first or second IP packet to the packet replication/selection component 132 and the IP switch fabric 138 sends a copy of the first or second IP packet to the packet replication/selection component 134.

The packet replication/selection component 132 generates a plurality of copies of the copy of the first or second IP packet received from the IP switch fabric 136. For example, the packet replication/selection component 132 generates two copies for propagation to the packet replication/selection components 126 and 130. The packet replication/selection component 134 generates a plurality of copies of the copy of the first or second IP packet received from the IP switch fabric 138. For example, the packet replication/selection component 134 generates two copies for propagation to the packet replication/selection components 126 and 130.

So, at this point four IP packets exist in the IP router 102. For example, each of the paddle cards 106 and 110 receive two IP packets. The packet replication/selection components 126 and 130 each have two IP packets to choose from for propagation. Therefore, the packet replication/selection component 126 passes one of the two IP packets to the line interface 118 and the packet replication/selection component 130 passes one of the two IP packets to the line interface 122. The line interfaces 118 and 122 each propagate the IP packet chosen by the packet replication/selection components 126 and 130. So, the IP router 102 in one example contemporaneously and/or simultaneously outputs two IP packets into the IP network. In one example, the IP router 102 sends the two packets to a duplex IP component in the IP network. In another example, the IP router 102 sends a first one of the two packet to a first IP component in the IP network and a second one of the two packets to a second IP component in the IP network. The two IP packets are substantially identical. For example, the two IP packets may be exact duplicates of each other to promote an increase in likelihood that the data of at least one of the IP packets arrives at the intended destination.

Figure 2:
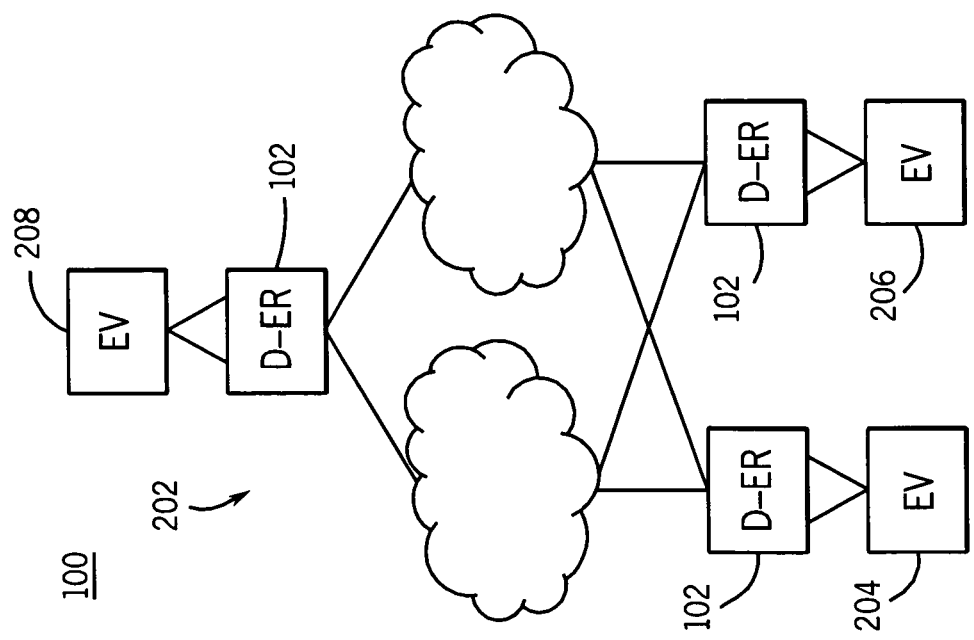
FIG. 2 is a representation of one exemplary employment of one or more of the one or more Internet Protocol routers of the apparatus of FIG. 1 as edge routers in an Internet Protocol network.

Referring to FIG. 2, an IP network 202 in one example comprises a plurality of edge vehicles ("EVs") 204, 206, and 208 and one or more of the IP routers 102. The edge vehicles 204, 206, and 208 comprise sources or destinations for IP packets. The IP network 202 illustrates one exemplary employment of the IP routers 102 as duplex edge routers ("D-ERs"). The IP routers 102 promote an increase in reliability for the IP network 202 by propagating a plurality of copies of an IP packet on the edge of the IP network 202. The IP routers 102 serve to transfer IP packets between the edge vehicles 204, 206, and 208 on the edge of the IP network 202.

Figure 3:
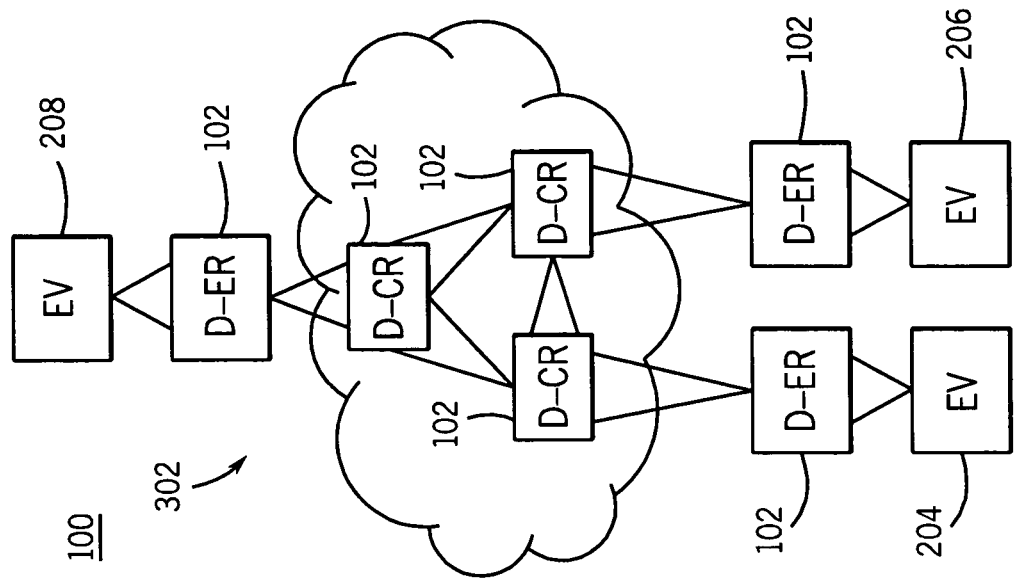
FIG. 3 is a representation of one exemplary employment of one or more of the one or more Internet Protocol routers of the apparatus of FIG. 1 as edge routers and core routers in an Internet Protocol network.

Referring to FIG. 3, an IP network 302 in one example comprises the plurality of edge vehicles 204, 206, and 208 and one or more of the IP routers 102. The IP network 302 illustrates one exemplary employment of the IP routers 102 as duplex edge routers and duplex core routers ("D-CRs"). The IP routers 102 promote an increase in reliability for the IP network 302 by propagating a plurality of copies of an IP packet on the edge and through the core of the IP network 302. The IP routers 102 serve to transfer IP packets between the edge vehicles 204, 206, and 208 on the edge of the IP network 302 and through the core of the IP network 302.

The apparatus 100 in one example comprises a plurality of components such as electronic components, computer hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. One example of a computer-readable signal-bearing medium for the apparatus 100 comprises one or more instances of the recordable data storage medium 170 of the paddle cards 104, 106, 108, and 110 and the switch fabrics 112 and 114. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a router for one or more packets that comprise an Internet Protocol ("IP") packet;
wherein the router comprises one or more packet replication components that employ the IP packet to propagate a plurality of copies of the IP packet; and
wherein the router contemporaneously receives a plurality of identical IP packets that comprise the IP packet, and wherein the router generates a plurality of copies of the plurality of identical IP packets and propagates the plurality of copies of the plurality of identical IP packets to an IP network component external to the router.

2. The apparatus of claim 1, wherein the router receives the IP packet, and wherein the one or more packet replication components comprises a packet replication component that employs the IP packet to generate the plurality of copies of the IP packet.

3. The apparatus of claim 2, wherein the plurality of copies of the IP packet comprise a first copy and a second copy of the IP packet; and
wherein the IP packet comprises an IP header, wherein each of the first copy and the second copy of the IP packet comprise a copy of the IP header.

4. The apparatus of claim 3, wherein both the first copy and the second copy of the IP packet are associated with a single IP address.

5. The apparatus of claim 2, wherein the plurality of copies of the IP packet comprise a first copy and a second copy of the IP packet; and
wherein the router comprises a first switch fabric and a second switch fabric; and
wherein the packet replication component sends the first copy to the first switch fabric, and wherein the packet replication component sends the second copy to the second switch fabric; and
wherein the first switch fabric routes the first copy through a first path to an intended destination of the IP packet, and wherein the second switch fabric routes the second copy through a second path to the intended destination of the IP packet.

6. The apparatus of claim 5, wherein upon a transmission failure in one of the first path or the second path, the router continues propagation of one of the first copy or the second copy to the intended destination on an available one of the first path or the second path.

7. The apparatus of claim 2, wherein the IP packet comprises a first IP packet, and wherein the router comprises a first line interface and a second line interface; and
wherein the router receives the first IP packet on the first line interface, and wherein the router receives a second IP packet on the second line interface contemporaneously with the first IP packet, and wherein the first IP packet and the second IP packet are substantially identical; and
wherein the packet replication component comprises a first packet replication component, and wherein the first line interface passes the first IP packet to the first packet replication component; and
wherein the second line interface passes the second IP packet to a second packet replication component.

8. The apparatus of claim 7, wherein the first packet replication component employs the first IP packet to propagate the plurality of copies of the first IP packet, and wherein the second packet replication component employs the second IP packet to propagate a plurality of copies of the second IP packet; and wherein the plurality of copies of the first IP packet comprise a first copy and a second copy of the first IP packet, and wherein the plurality of copies of the second IP packet comprise a first copy and a second copy of the second IP packet; and wherein the router comprises a first packet selection component and a second packet selection component; and wherein the first packet replication component sends the first copy of the first IP packet to the first packet selection component, and wherein the second packet replication component sends the first copy of the second IP packet to the first packet selection component; and wherein the first packet replication component sends the second copy of the first IP packet to the second packet selection component, and wherein the second packet replication component sends the second copy of the second IP packet to the second packet selection component.

9. The apparatus of claim 8, wherein the router comprises a first IP switch fabric and a second IP switch fabric; and wherein the first packet selection component sends one of the first copy of the first IP packet and the first copy of the second IP packet to the first IP switch fabric, and wherein the second packet selection component sends one of the second copy of the first IP packet and the second copy of the second IP packet to the second IP switch fabric.

10. The apparatus of claim 9, wherein the first IP packet and the second IP packet Comprise an indication of a destination; and wherein the first IP switch fabric routes the one of the first copy of the first IP packet and the first copy of the second IP packet through a first path to the destination, and wherein the second IP switch fabric routes the one of the second copy of the first IP packet and the second copy of the second IP packet through a second path to the destination.

11. The apparatus of claim 1, wherein the IP packet is associated with a real-time application, and wherein the router contemporaneously propagates the plurality of copies of the IP packet to promote an increase in likelihood that at least one copy of the plurality of copies of the IP packet arrives at the real-time application.

12. The apparatus of claim 1, wherein the router comprises a packet selection component that receives two IP packets and chooses one of the two IP packets for propagation.

13. The apparatus of claim 1, wherein the router comprises a duplex edge router, the apparatus further comprising a duplex core router;

wherein the plurality of copies of the IP packet are associated with a single IP address; and wherein the duplex edge router contemporaneously propagates the plurality of copies of the IP packet to the duplex core router.

14. The apparatus of claim 1, wherein the one or more packet replication components comprise a packet replication component that receives the IP packet; and wherein the packet replication component propagates the plurality of copies of the IP packet, and wherein the plurality of copies or the IP packet comprise the IP packet received by the packet replication component and one reproduction of the IP packet.

15. A method, comprising the steps of:

receiving an IP packet:

generating a plurality of copies of the IP packet, wherein the plurality of copies of the IP packet comprise a first copy of the IP packet and a second copy of the IP packet;

propagating the first copy of the IP packet through a first path to an intended destination of the IP packet; and propagating the second copy of the IP packet through a second path to the intended destination of the IP packet;

the method further comprising the steps of:

receiving contemporaneously a plurality of identical IP packets that comprise the IP packet;

generating a plurality of copies of the plurality of identical IP packets; and propagating the plurality of copies of the plurality of identical IP nackets to an IP network.

16. The method of claim 15, wherein the IP packet is associated with a real-time application, and wherein the step of propagating the second copy of the IP packet through the second path to the intended destination of the IP packet comprises the step of:

propagating the second copy of the IP packet through the second path different than the first path to promote an Increase in likelihood that at least one copy of the plurality of copies of the IP packet arrives at the real-time application.

17. The method of claim 15, wherein the step of propagating the first copy of the IP packet through the first path to the intended destination of the IP packet Comprises the steps of:

sending the first copy of the IP packet to a first packet selection component;

selecting the first copy of the IP packet from one or more available IP packets at the first packet selection component for passage to a first IP switch fabric; and routing the first copy from the first IP switch fabric through the first path to the intended destination of the IP packet;

wherein the step of propagating the second copy of the IP packet through the second path to the intended destination of the IP packet comprises the steps of:

sending the second copy of the IP packet to a second packet selection component;

selecting the second copy of the IP packet from one or more available IP packets at the second packet selection component for passage to a second IP switch fabric; and routing the second copy from the second switch fabric through the second path to the intended destination of the IP packet.

18. The method of claim 15, wherein the IP packet comprises an IP header, and wherein the step of generating the plurality of copies of the IP packet comprises the steps of:

generating the first copy of the IP packet that comprises a copy of the IP header; and generating the second copy of the IP packet that comprises a copy of the IP header;

associating both the first copy and the second copy of the IP packet with a single IP address.

19. The method of claim 15, wherein the step of propagating the first copy of the IP packet through the first path to the intended destination of the IP packet comprises the step of:

selecting the first copy of the IP packet from the plurality of copies of the IP packet for contemporaneous propagation with the second copy of the IP packet to the intended destination of the IP packet;

wherein the step of propagating the second copy of the IP packet through the second path to the intended destination of the IP packet comprises the step of:

selecting the second copy of the IP packet from the plurality of copies of the IP packet for contemporaneous propagation with the second copy of the IP packet to the intended destination of the IP packet.

20. A computer-readable medium having computer executable instructions for performing steps, comprising:

means in the one or more media for receiving an IP packet;

means in the one or more media for generating a plurality of copies of the IP packet, wherein the plurality of copies of the IP packet comprise a first copy of the IP packet and a second copy of the IP packet;

means in the one or more media for propagating the first copy of the IP packet through a first path to an intended destination of the IP packet; and means in the one or more media for propagating the second copy of the IP packet through a second path to the intended destination of the IP packets;

means in the one or more media for receiving contemporaneously a plurality of identical IP packets that comprise the IP packet;

means in the one or more media for generating a plurality of copies of the plurality of identical IP packets and means in the one or more media for propagating the plurality of copies of the plurality of identical IP packets to an IP network.

* * * * *